(12) United States Patent
Kim et al.

(10) Patent No.: US 12,111,687 B2
(45) Date of Patent: Oct. 8, 2024

(54) BASE FILM, PREPARATION METHOD THEREOF, AND COVER WINDOW AND DISPLAY DEVICE COMPRISING SAME

(71) Applicant: SK microworks Co., Ltd., Gyeonggi-do (KR)

(72) Inventors: Sunhwan Kim, Incheon (KR); Jung Hee Ki, Gyeonggi-do (KR); Han Jun Kim, Gyeonggi-do (KR); Dae Seong Oh, Seoul (KR); Jin Woo Lee, Seoul (KR); Sang Hun Choi, Seoul (KR)

(73) Assignee: SK MICROWORKS CO., LTD., Gyeonggi-do (KR)

( * ) Notice: Subject to any disclaimer, the term of this patent is extended or adjusted under 35 U.S.C. 154(b) by 486 days.

(21) Appl. No.: 16/913,366

(22) Filed: Jun. 26, 2020

(65) Prior Publication Data
US 2020/0409413 A1 Dec. 31, 2020

(30) Foreign Application Priority Data

Jun. 28, 2019 (KR) .................. 10-2019-0078286
Dec. 18, 2019 (KR) .................. 10-2019-0169716

(51) Int. Cl.
| | | |
|---|---|---|
| G06F 1/16 | (2006.01) | |
| B29C 48/00 | (2019.01) | |
| B29C 48/91 | (2019.01) | |
| B29C 55/00 | (2006.01) | |
| B29C 55/08 | (2006.01) | |
| C08G 73/14 | (2006.01) | |
| G02B 1/04 | (2006.01) | |
| G02B 1/14 | (2015.01) | |
| B29K 77/00 | (2006.01) | |

(52) U.S. Cl.
CPC ........ *G06F 1/1609* (2013.01); *B29C 48/0018* (2019.02); *B29C 48/91* (2019.02); *B29C 55/005* (2013.01); *B29C 55/08* (2013.01); *C08G 73/14* (2013.01); *G02B 1/04* (2013.01); *G02B 1/14* (2015.01); *B29K 2077/00* (2013.01); *B29K 2995/0018* (2013.01); *B29K 2995/0069* (2013.01); *C08J 2377/10* (2013.01); *C08J 2379/08* (2013.01)

(58) Field of Classification Search
CPC .......... G06F 1/1609; G02B 1/04; G02B 1/14; C08G 73/14; C08J 2377/10; C08J 2379/08
USPC ..................................... 361/679.02
See application file for complete search history.

(56) References Cited

U.S. PATENT DOCUMENTS

2015/0152232 A1* 6/2015 Ju .................. C08J 5/18
  524/442
2020/0339769 A1* 10/2020 Lee .................. C08L 79/08

FOREIGN PATENT DOCUMENTS

| KR | 10-2014-0002521 A | 1/2014 |
| KR | 10-2015-0037440 A | 4/2015 |
| KR | 10-1839293 B1 | 3/2018 |

* cited by examiner

*Primary Examiner* — Ruiyun Zhang
(74) *Attorney, Agent, or Firm* — IP & T GROUP LLP

(57) ABSTRACT

Embodiments relate to a base film that is colorless, transparent, and excellent in mechanical properties and optical properties, particularly with low moisture permeability, a process for preparing the same, and a cover window and a display device comprising the same. The cover window comprises a base film comprising a polyamide-based polymer and having a moisture permeability of 300 g/m²·day or less; and a functional layer.

8 Claims, 3 Drawing Sheets

BASE FILM, PREPARATION METHOD THEREOF, AND COVER WINDOW AND DISPLAY DEVICE COMPRISING SAME

TECHNICAL FIELD

Embodiments relate to a base film that is colorless, transparent, and excellent in mechanical properties and optical properties, particularly with low moisture permeability, a process for preparing the same, and a cover window and a display device comprising the same.

BACKGROUND ART OF THE INVENTION

Polyimide-based resins such as poly(amide-imide) (PA) are excellent in resistance to friction, heat, and chemicals, Thus, they are employed in such applications as primary electrical insulation, coatings, adhesives, resins for extrusion, heat-resistant paintings, heat-resistant boards, heat-resistant adhesives, heat-resistant fibers, and heat-resistant films.

Polyimide is used in various fields. For example, polyimide is made in the form of a powder and used as a coating for a metal or a magnetic wire. It is mixed with other additives depending on the application thereof. In addition, polyimide is used together with a fluoropolymer as a painter for decoration and corrosion prevention. It also plays a role of bonding a fluoropolymer to a metal substrate. In addition, polyimide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyimide has been developed in the form of a film, which is less expensive and has excellent optical, mechanical, and thermal characteristics. Such a polyimide-based film may be applied to display materials for organic light-emitting diodes (OLEDs) or liquid crystal displays (LCDs), and the like, and to antireflection films, compensation films, and retardation films when phase difference properties are implemented.

When the polyimide-based film is applied to a display device, the transparent cover window employed in the display device comprises a hard-coating layer and a base film. In the course of forming the hard-coating layer, there may arise a problem that the haze increases or the adhesive strength decreases, resulting in a deterioration in the optical properties. Thus, there has been a continuous demand for research on the development of a film capable of simultaneously enhancing the transparency, mechanical properties, and durability in a high-humidity environment while the above problem is solved.

DISCLOSURE OF THE INVENTION

Problem to be Solved

Embodiments aim to provide a base film that is colorless, transparent, and excellent in mechanical properties and optical properties, particularly with low moisture permeability, a process for preparing the same, and a cover window and a display device comprising the same.

Solution to the Problem

The cover window for a display device according to an embodiment comprises a base film comprising a polyamide-based polymer and having a moisture permeability of 300 $g/m^2 \cdot day$ or less; and a functional layer.

The base film for a display device according to another embodiment comprises a polyamide-based polymer and has a moisture permeability of 300 $g/m^2 \cdot day$ or less.

The display device according to still another embodiment comprises a display unit; and a cover window disposed on the display unit, wherein the cover window comprises a base film and a functional layer, and the base film has a moisture permeability of 300 $g/m^2 \cdot day$ or less.

The process for producing a base film for a display device according to an embodiment comprises preparing a polyamide-based polymer solution in an organic solvent; charging the polymer solution into a tank; extruding and casting the polymer solution in the tank and then drying it to prepare a gel sheet; and thermally treating the gel sheet.

Advantageous Effects of the Invention

The base film for a display device according to an embodiment is colorless, transparent, and excellent in mechanical properties and optical properties, particularly with low moisture permeability, so that it can maintain excellent durability even in a high-humidity environment.

Further, the base film for a display device according to an embodiment has low moisture permeability characteristics, so that it can be advantageously applied to a cover window for a display device and a foldable display device or a flexible displace device.

DETAILED DESCRIPTION FOR CARRYING OUT THE INVENTION

Figure 1:
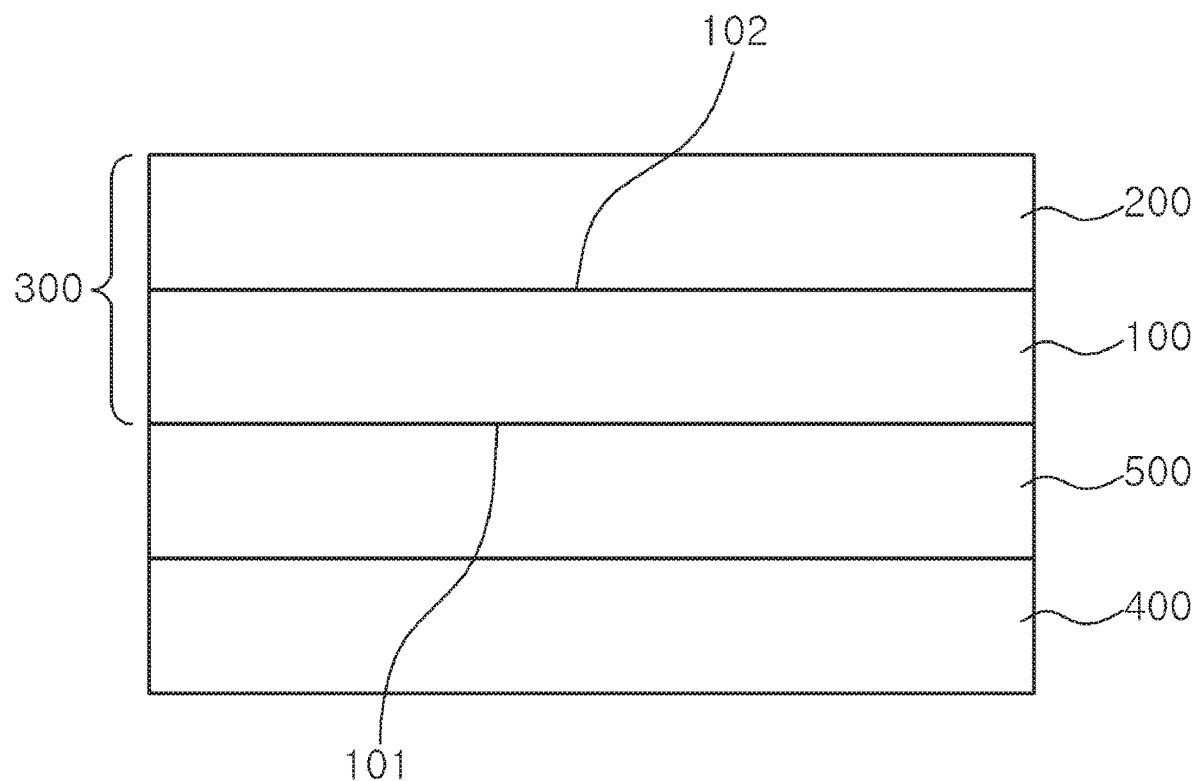
FIG. 1 is a cross-sectional view of a display device according to an embodiment.

Hereinafter, the embodiments will be described in detail with reference to the accompanying drawings so that those skilled in the art to which the present invention pertains may easily practice them. However, the embodiments may be implemented in many different ways and are not limited to those described herein.

Throughout the present specification, in the case where each film, window, panel, layer, or the like is mentioned to be formed "on" or "under" another film, window, panel, layer, or the like, it means not only that one element is directly formed on or under another element, but also that one element is indirectly formed on or under another element with other element(s) interposed between them. In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is interpreted to cover a singular or plural number that is interpreted in context unless otherwise specified.

Further, all numbers and expression related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

In addition, the term "substituted" as used herein means to be substituted with at least one substituent group selected from the group consisting of deuterium, —F, —Cl, —Br, —I, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

Cover Window for a Display Device

Embodiments provide a cover window, which comprises a base film that is colorless, transparent, and excellent in mechanical properties and optical properties, particularly with low moisture permeability.

The cover window for a display device according to an embodiment comprises a base film and a functional layer.

The base film comprises a polyamide-based polymer and has a moisture permeability of 300 g/m²·day or less.

Since the cover window comprising a base film having low moisture permeability according to an embodiment is excellent in durability in a high-humidity environment, it can be advantageously applied to a display device.

The display device may be a foldable display device or a flexible displace device.

The base film has a moisture permeability of 300 g/m²·day or less.

Specifically, the moisture permeability of the base film is 30 g/m²·day to 300 g/m²·day. Alternatively, the moisture permeability of the base film may be 280 g/m²·day or less, 260 g/m²·day or less, 250 g/m²·day or less, 200 g/m²·day or less, or 180 g/m²·day or less, but it is not limited thereto.

The moisture permeability of the base film is based on the thickness direction. That is, the moisture permeability is a moisture permeability in the thickness direction, that is, a value measured in the thickness direction of the base film.

The thickness of the base film may be about 20 μm to about 150 μm. The thickness of the base film may be about 30 μm to about 120 μm or about 35 μm to about 100 μm.

The moisture permeability may be a value determined based on a thickness of about 50 μm of the base film. Thus, if the thickness of the base film is greater than about 50 μm, the actual moisture permeability of the thick base film may be lower. On the other hand, if the thickness of the base film is less than about 50 μm, the actual moisture permeability of the thin base film may be higher. For example, the moisture permeability of the base film thicker or thinner than the reference thickness may be determined in inverse proportion to the reference thickness.

On the other hand, the base film itself may have the above moisture permeability. When the base film has the above thickness range, it may have the above moisture permeability.

When the base film has an appropriate thickness and an appropriately low moisture permeability, it is suitable for application to a cover window for a foldable display. When the base film has an appropriate thickness, it may have appropriate optical properties and mechanical properties.

As the moisture permeability of the base film satisfies the above range, it is possible to provide a cover window and a display device having high durability even in a high-humidity environment. It is advantageous for preventing external moisture from penetrating through the cover window and deteriorating the physical properties of the adhesive layer between the cover window and the display panel.

The content of the residual solvent in the base film is 1,000 ppm or less.

For example, the content of the residual solvent in the base film may be 800 ppm or less, 700 ppm or less, 500 ppm or less, or 400 ppm or less, but it is not limited thereto.

The lower limit of the content of the residual solvent in the base film may be 1 ppm. The lower limit of the content of the residual solvent in the base film may be 5 ppm. The lower limit of the content of the residual solvent in the base film may be 10 ppm.

The residual solvent refers to the amount of solvents that are not volatilized during the film production and remains in the film finally produced.

If the content of the residual solvent in the base film exceeds the above range, the durability of the film in a high-humidity environment may be deteriorated, which, in particular, may have an impact on the subsequent processing of the film. Specifically, if the content of the residual solvent exceeds the above range, the moisture permeability of the film is increased, resulting in a deterioration in the mechanical properties or the optical properties.

In the base film, the IS value represented by the following Equation 1 is 10 to 100.

$$IS = IM + \frac{RS}{10} \quad \text{[Equation 1]}$$

In Equation 1, IM stands for the number of moles of the imide repeat unit when the total number of moles of the imide repeat unit and the amide repeat unit in the film is 100; and RS stands for the content (ppm) of the residual solvent in the film.

For example, the IS value may be 90 or less, 80 or less, 70 or less, 60 or less, 50 or less, or 40 or less, but it is not limited thereto. As another example, the IS value may be 10 to 80 or 10 to 60, but it is not limited thereto.

If the IS value of the base film satisfies the above range, it is possible to achieve a film that is excellent in not only durability in a high-humidity environment but also such optical properties as transparency and such mechanical properties as modulus.

In particular, if the above range is exceeded since the content of the imide repeat unit (IM) is high or the content of the residual solvent (RS) is high, the durability of the film in a high-humidity environment is rapidly deteriorated. Specifically, if the imide content is too high and the content of the amide is thus relatively reduced, it is disadvantageous in that the mechanical properties are deteriorated.

The base film according to an embodiment comprises a polyamide-base polymer.

The polyamide-based polymer is a polymer that comprises an amide repeat unit.

In addition, the polymer contained in the film may optionally comprise an imide repeat unit.

The base film comprises a polyamide-based polymer. The polyamide-based polymer may be prepared by simultaneously or sequentially reacting reactants that comprise a diamine compound and a dicarbonyl compound. Specifically, the polyamide-based polymer is prepared by polymerizing a diamine compound and a dicarbonyl compound.

Alternatively, the polyamide-based polymer is prepared by polymerizing a diamine compound, a dianhydride compound, and a dicarbonyl compound. Here, the polyamide-based polymer comprises an imide repeat unit derived from the polymerization of the diamine compound and the dianhydride compound and an amide repeat unit derived from the polymerization of the diamine compound and the dicarbonyl compound.

The base film according to an embodiment comprises a polyamide-based polymer formed by polymerizing a diamine compound, a dicarbonyl compound, and optionally a dianhydride compound.

As an embodiment, the molar ratio of the dianhydride compound and the dicarbonyl compound is 0:100 to 25:75, 0:100 to 20:80, or 0:100 to 15:85.

If the molar ratio of the dianhydride compound and the dicarbonyl compound is within the above range, a film having low moisture permeability can be obtained.

As another embodiment, the dianhydride compound may be composed of zero or one type, and the dicarbonyl compound may be composed of two types.

The diamine compound is a compound that forms an imide bond with the dianhydride compound and forms an amide bond with the dicarbonyl compound, to thereby form a copolymer.

The diamine compound is not particularly limited, but it may be, for example, an aromatic diamine compound that contains an aromatic structure. For example, the diamine compound may be a compound represented by the following Formula 1.

$$H_2N-(E)_e-NH_2 \quad [\text{Formula 1}]$$

In Formula 1,

E may be selected from a substituted or unsubstituted divalent $C_6$-$C_3$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

e is selected from integers of 1 to 5. When e is 2 or more, the Es may be the same as, or different from, each other.

(E)$_e$ in Formula 1 may be selected from the groups represented by the following Formulae 1-1a to 1-14a, but it is not limited thereto.

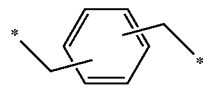

1-1a

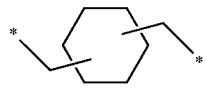

1-2a

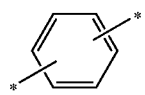

1-3a

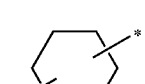

1-4a

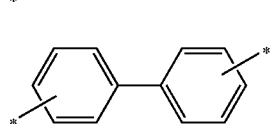

1-5a

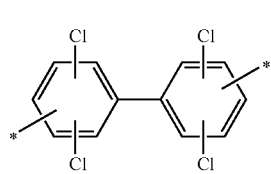

1-6a

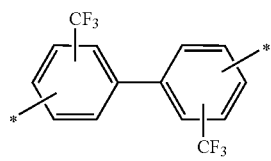

1-7a

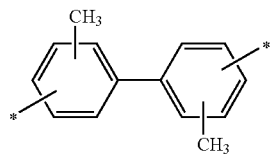

1-8a

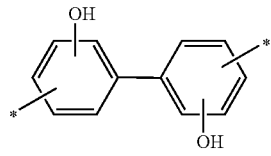

1-9a

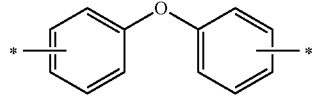

1-10a

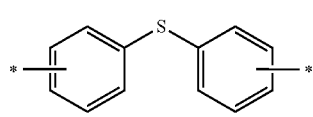

1-11a

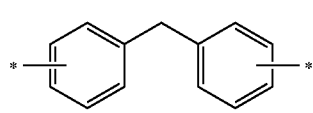

1-12a

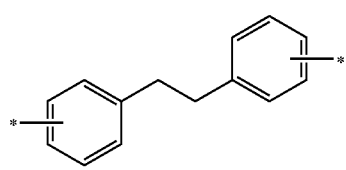

1-13a

-continued

(n is selected from integers of 1 to 12)

Specifically, (E) in Formula 1 may be selected from the groups represented by the following Formulae 1-1b to 1-13b, but it is not limited thereto.

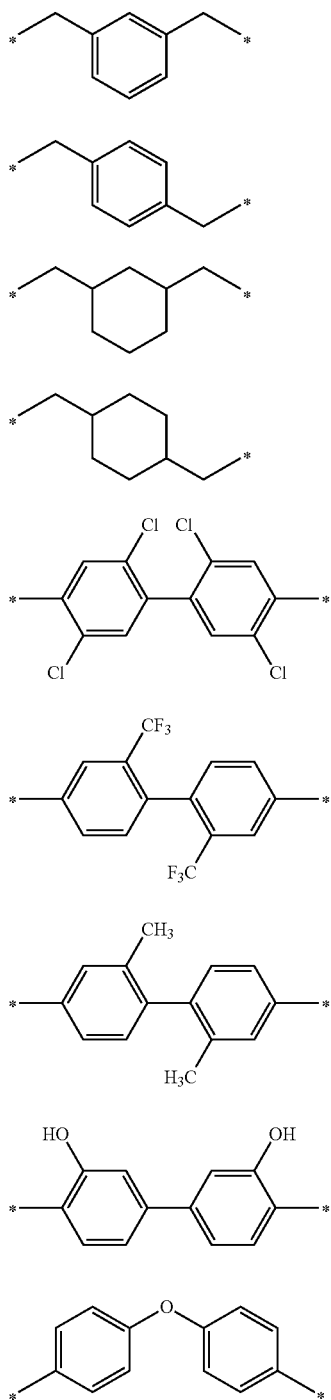

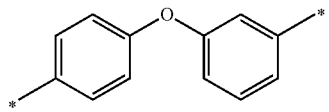

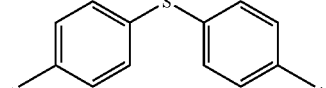

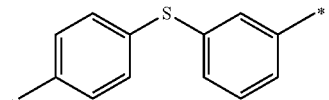

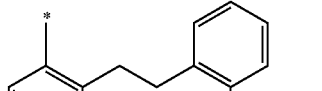

More specifically, $(E)_e$ in Formula 1 may be the group represented by the above Formula 1-6b or the group represented by the above Formula 1-9b.

In an embodiment, the diamine compound may comprise a compound having a fluorine-containing substituent or an ether group (—O—).

The diamine compound may be composed of a compound having a fluorine-containing substituent. In such event, the fluorine-containing substituent maybe a fluorinated hydrocarbon group and specifically may be a trifluoromethyl group. But it is not limited thereto.

In another embodiment, one kind of diamine compound may be used as the diamine compound. That is, the diamine compound may be composed of a single component.

For example, the diamine compound may comprise 2,2'-bis(trifluoromethyl)-4,4'-diaminobiphenyl (TFDB) represented by the following formula, but it is not limited thereto.

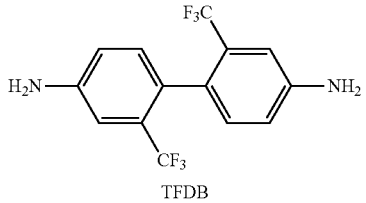

TFDB

The dianhydride compound has a low birefringence value, so that it can contribute to enhancements in the optical properties such as transmittance of a film that comprises the polyimide-based polymer. The polyimide-based polymer refers to a polymer that contains an imide repeat unit.

The dianhydride compound is not particularly limited, but it may be, for example, an aromatic dianhydride compound that contains an aromatic structure. For example, the aromatic dianhydride compound may be a compound represented by the following Formula 2.

[Formula 2]

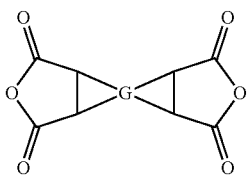

In Formula 2, G may be bonded by a bonding group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone or may be bonded to each other to form a condensed ring, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

G in Formula 2 may be selected from the groups represented by the following Formulae 2-1a to 2-9a, but it is not limited thereto.

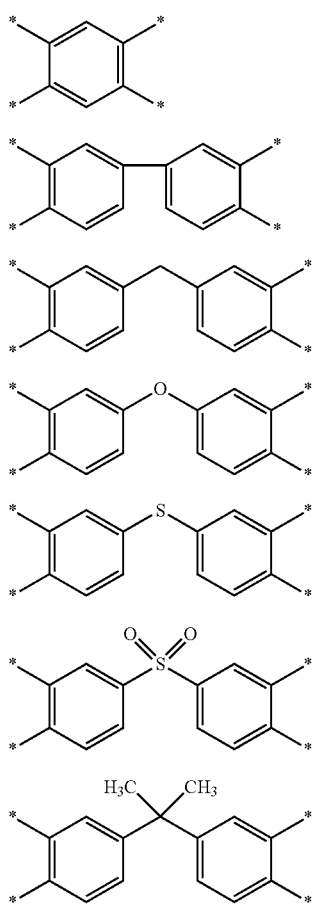

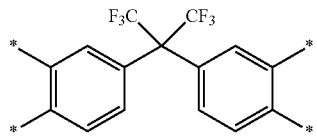

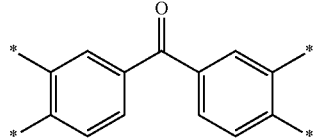

For example, G in Formula 2 may be the group represented by the above Formula 2-2a, the group represented by the above Formula 2-8a, or the group represented by the above Formula 2-9a.

In an embodiment, the dianhydride compound may comprise a compound having a fluorine-containing substituent, a compound having a biphenyl group, or a compound having a ketone group.

The dianhydride compound may be composed of a compound having a fluorine-containing substituent. In such event, the fluorine-containing substituent may be a fluorinated hydrocarbon group and specifically may be a trifluoromethyl group. But it is not limited thereto.

In another embodiment, the dianhydride compound may be composed of a single component or a mixture of two components.

For example, the dianhydride compound may comprise 2,2'-bis-(3,4-dicarboxyphenyl)hexafluoropropane dianhydride (6FDA) represented by the following formula, but it is not limited thereto.

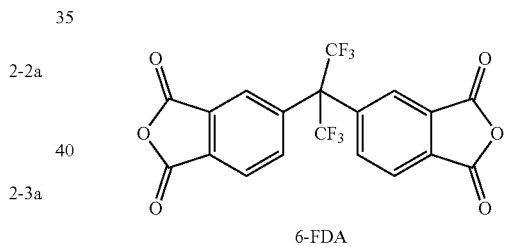

6-FDA

The diamine compound and the dianhydride compound may be polymerized to form a polyamic acid.

Subsequently, the polyamic acid may be converted to a polyimide through a dehydration reaction, and the polyimide comprises an imide repeat unit.

The polyimide may form a repeat unit represented by the following Formula A.

[Formula A]

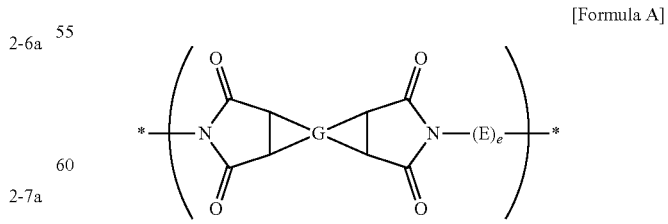

In Formula A, E, G, and e are as described above.

For example, the polyimide may comprise a repeat unit represented by the following Formula A-1, but it is not limited thereto.

[Formula A-1]

In Formula A-1, n is an integer of 1 to 400.

The dicarbonyl compound is not particularly limited, but it may be, for example, a compound represented by the following Formula 3.

[Formula 3]

In Formula 3,

J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

j is selected from integers of 1 to 5. When j is 2 or more, the Js may be the same as, or different from, each other.

X is a halogen atom. Specifically, X may be F, Cl, Br, I, or the like. More specifically, X may be Cl, but it is not limited thereto.

(J)$_j$ in Formula 3 may be selected from the groups represented by the following Formulae 3-1a to 3-14a, but it is not limited thereto.

3-1a 3-2a 3-3a 3-4a 3-5a 3-6a 3-7a 3-8a 3-9a 3-10a 3-11a 3-12a 3-13a 3-14a

*—(CH$_2$)$_a$—*

(n is selected from integers of 1 to 12)

Specifically, (J)$_j$ in Formula 3 may be selected from the groups represented by the following Formulae 3-1b to 3-8b, but it is not limited thereto.

3-1b 3-2b

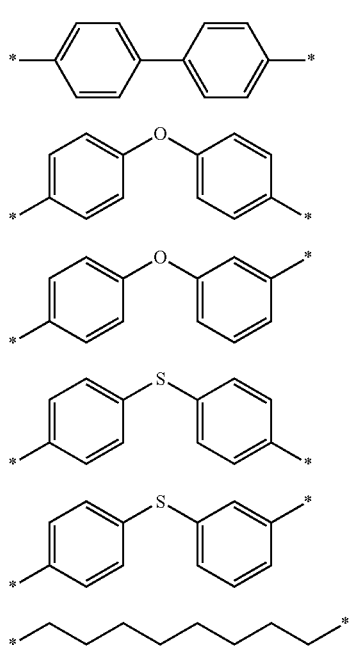

More specifically, $(J)_j$ in Formula 3 may be the group represented by the above Formula 3-1b, the group represented by the above Formula 3-2b, the group represented by the above Formula 3-3b, or the group represented by the above Formula 3-8b.

In an embodiment, a mixture of at least two kinds of dicarbonyl compounds different from each other may be used as the dicarbonyl compound. If two or more dicarbonyl compounds are used, at least two dicarbonyl compounds in which $(J)_j$ in the above Formula 3 is selected from the groups represented by the above Formulae 3-1b to 3-8b may be used as the dicarbonyl compound.

In another embodiment, the dicarbonyl compound may be an aromatic dicarbonyl compound that contains an aromatic structure.

For example, the dicarbonyl compound may comprise a first dicarbonyl compound and/or a second dicarbonyl compound.

The first dicarbonyl compound and the second dicarbonyl compound may be an aromatic dicarbonyl compound, respectively.

The first dicarbonyl compound and the second dicarbonyl compound may be compounds different from each other.

For example, the first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of a film that comprises the polyamide-based polymer thus produced.

The dicarbonyl compound may comprise terephthaloyl chloride (TPC), 1,1'-biphenyl-4,4'-dicarbonyl dichloride (BPDC), isophthaloyl chloride (IPC), as represented by the following formulae, or a combination thereof. But it is not limited thereto.

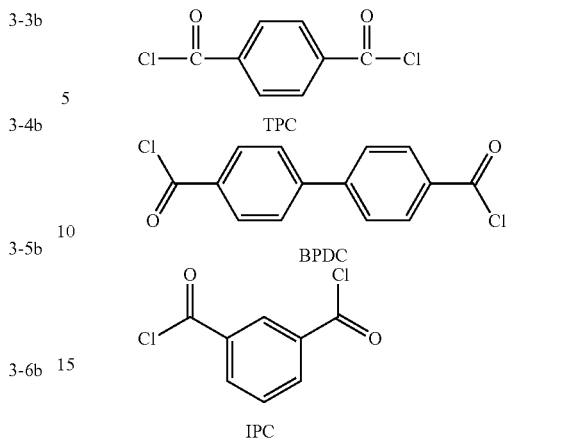

For example, the first dicarbonyl compound may comprise BPDC, and the second dicarbonyl compound may comprise TPC, but they are not limited thereto.

Specifically, if BPDC is used as the first dicarbonyl compound and TPC is used as the second dicarbonyl compound in a proper combination, a film that comprises the polyamide-based resin thus produced may have high oxidation resistance.

Alternatively, the first dicarbonyl compound may comprise IPC, and the second dicarbonyl compound may comprise TPC, but they are not limited thereto.

If IPC is used as the first dicarbonyl compound and TPC is used as the second dicarbonyl compound in a proper combination, a film that comprises the polyamide-based resin thus produced may not only have high oxidation resistance, but is also economical since the costs can be reduced.

The diamine compound and the dicarbonyl compound may be polymerized to form a repeat unit represented b the following Formula B.

[Formula B]

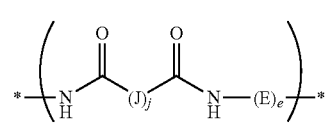

In Formula B, E, J, e, and j are as described above.

For example, the diamine compound and the dicarbonyl compound may be polymerized to form amide repeat units represented by the following Formulae B-1 and B-2.

Alternatively, the diamine compound and the dicarbonyl compound may be polymerized to form amide repeat units represented by the following Formulae B-2 and B-3.

[Formula B-1]

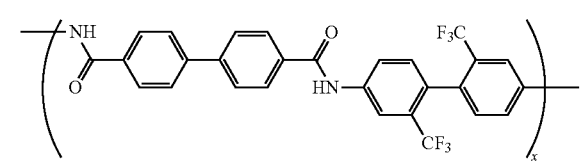

In Formula B-1, x is an integer of 1 to 400.

[Formula B-2]

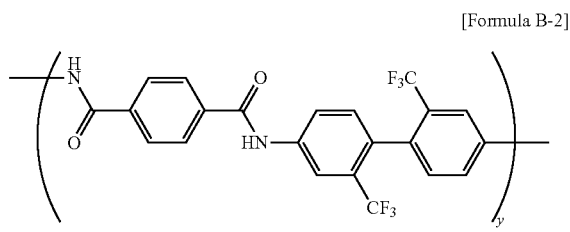

In Formula B-2, y is an integer of 1 to 400.

[Formula B-3]

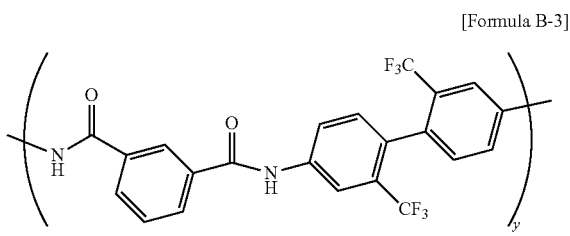

In Formula B-3, y is an integer of 1 to 400.

According to an embodiment, the polyamide-based polymer may comprise a repeat unit represented by the following Formula A and a repeat unit represented by the following Formula B:

[Formula A]

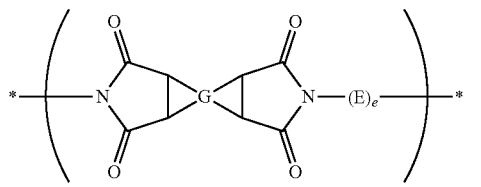

[Formula B]

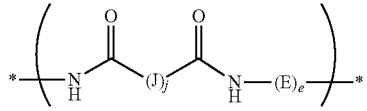

In Formulae A and B,

E and J are each independently selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—, e and j are each independently selected from integers of 1 to 5, when e is 2 or more, then the 2 or more Es are the same as, or different from, each other, when j is 2 or more, then the 2 or more Js are the same as, or different from, each other, and G may be bonded by a bonding group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone or may be bonded to each other to form a condensed ring, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

In the polyamide-base polymer, the molar ratio of the repeat unit represented by the above Formula A to the repeat unit represented by the above Formula B may be 0:100 to 25:75, 0:100 to 20:80, or 0:100 to 15:85, but it is not limited thereto.

If the molar ratio of the repeat unit represented by the above Formula A to the repeat unit represented by the above Formula B is within the above range, it is possible to obtain a base film that is excellent in optical properties and mechanical properties, particularly with low moisture permeability.

According to another embodiment, the base film may further comprise a filler.

The filler may be at least one selected from the group consisting of barium sulfate, silica, and calcium carbonate. As the base film comprises the filler, it is possible to enhance not only the roughness and rollability but also the effect of improving the scratches caused by sliding in the preparation of the film.

In addition, the filler may have a particle diameter of 0.01 µm to less than 1.0 µm. For example, the particle diameter of the filler may be 0.05 µm to 0.9 µm or 0.1 µm to 0.8 µm, but it is not limited thereto.

The base film may comprise the filler in an amount of 0.01 to 3% by weight based on the total weight of the base film.

The base film has a yellow index of 5 or less. For example, the yellow index may be 4 or less, or 3 or less, but it is not limited thereto.

The base film has a transmittance of 80% or more. For example, the transmittance may be 85% or more, 88% or more, 89% or more, 80% to 99%, 88% to 99%, or 89% to 99%, but it is not limited thereto.

The base film has a haze of 2 or less. For example, the haze may be 1.5% or less, 1% or less, 0.8% or less, 0.6% or less, 0.5% or less, or 0.4% or less, but it is not limited thereto.

The base film has a modulus of 5.0 GPa or more. Specifically, the modulus may be 5.5 GPa or more, 6.0 GPa or more, 6.5 GPa or more, or 7.0 GPa or more, but it is not limited thereto.

The base film has a compressive strength is 0.4 kgf/µm or more. Specifically, the compressive strength may be 0.45 kgf/µm or more, or 0.46 kgf/µm or more, but it is not limited thereto.

When the base film is perforated at a rate of 10 mm/min using a 2.5-mm spherical tip in a UTM compression mode, the maximum diameter (mm) of perforation including a crack is 60 mm or less. Specifically, the maximum diameter of perforation may be 5 to 60 mm, 10 to 60 mm, 15 to 60 mm, 20 to 60 mm, 25 to 60 mm, or 25 to 58 mm, but it is not limited thereto.

The base film has a surface hardness of HB or higher. Specifically, the surface hardness may be H or higher, or 2H or higher, but it is not limited thereto.

The base film has a tensile strength of 15 kgf/mm² or more. Specifically, the tensile strength may be 18 kgf/mm² or more, 20 kgf/mm² or more, 21 kgf/mm² or more, or 22 kgf/mm² or more, but it is not limited thereto.

The base film has an elongation of 15% or more. Specifically, the elongation may be 16% or more, 17% or more, or 17.5% or more, but it is not limited thereto.

The base film according to an embodiment has excellent optical properties in terms of low haze, low yellow index, and high transmittance, as well as low moisture permeability, thereby securing excellent durability even in a high-humidity environment. Accordingly, when it is applied to a cover window for a foldable display, it produces an effect of enhancing the image quality and reliability of the display device.

The physical properties of the base film as described above are based on a thickness of 40 µm to 60 µm. For example, the physical properties of the base film are based on a thickness of 50 µm.

The features on the components and properties of the base film as described above may be combined with each other.

For example, the base film may have a yellow index of 3 or less, a transmittance of 88% or more, a haze of 1% or less, and a modulus of 6.0 GPa or more, but it is not limited thereto.

In addition, the properties of the base film as described above are the results materialized by combinations of the chemical and physical properties of the components, which constitute the base film, along with the conditions in each step of the process for preparing the base film as described below.

Base Film for a Display Device

Embodiments provide a base film that is colorless, transparent, and excellent in mechanical properties and optical properties, particularly with low moisture permeability.

The base film comprises a polyamide-based polymer and has a moisture permeability of 300 g/m²·day or less.

The details on the base film are as described above.

Display Device

The display device according to an embodiment comprises a display unit; and a cover window disposed on the display unit, wherein the cover window comprises a base film and a functional layer, and the base film comprises a polyamide-based polymer and has a moisture permeability of 300 g/m²·day or less.

The details on the base film and the cover window are as described above.

FIG. 1 is a cross-sectional view of a display device according to an embodiment.

Specifically, FIG. 1 illustrates a display device, which comprises a display unit (400) and a cover window (300) disposed on the display unit (400), wherein the cover window comprises a base film (100) having a first side (101) and a second side (102) and a functional layer (200), and an adhesive layer (500) is interposed between the display device (400) and the cover window (300).

The display unit (400) is for displaying an image, and it may have flexible characteristics.

The display unit (400) may be a display panel for displaying an image. For example, it may be a liquid crystal display panel or an organic electroluminescent display panel. The organic electroluminescent display panel may comprise a front polarizing plate and an organic EL panel.

The front polarizing plate may be disposed on the front side of the organic EL panel. Specifically, the front polarizing plate may be attached to the side on which an image is displayed in the organic EL panel.

The organic EL panel displays an image by self-emission of a pixel unit. The organic EL panel may comprise an organic EL substrate and a driving substrate. The organic EL substrate may comprise a plurality of organic electroluminescent units, each of which corresponds to a pixel. Specifically, it may comprise a cathode, an electron transport layer, a light-emitting layer, a hole transport layer, and an anode. The driving substrate is operatively coupled to the organic EL substrate. That is, the driving substrate may be coupled to the organic EL substrate so as to apply a driving signal such as a driving current, so that the driving substrate can drive the organic EL substrate by applying a current to the respective organic electroluminescent units.

In addition, an adhesive layer (500) may be interposed between the display unit (400) and the cover window (300). The adhesive layer may be an optically transparent adhesive layer, but it is not particularly limited.

The cover window (300) is disposed on the display unit (400). The cover window is located at the outermost position of the display device according to an embodiment to thereby protect the display panel.

The cover window (300) may comprise a base film and a functional layer. The functional layer may be at least one selected from the group consisting of a hard coating, a reflectance reducing layer, an antifouling layer, and an antiglare layer. The functional layer may be coated on at least one side of the base film.

Since the display device according to an embodiment comprises a base film having low moisture permeability, it can advantageously protect the display unit in a high-humidity environment.

Process for Preparing a Base Film for a Display Device

An embodiment provides a process for preparing a base film for a display device.

The process for preparing a base film according to an embodiment comprises preparing a polyamide-based polymer solution in an organic solvent; charging the polymer solution into a tank; extruding and casting the polymer solution in the tank and then drying it to prepare a gel sheet; and thermally treating the gel sheet. Here, the thermal treatment step of the gel sheet is carried out in two or more treatment steps with hot air.

Figure 2:
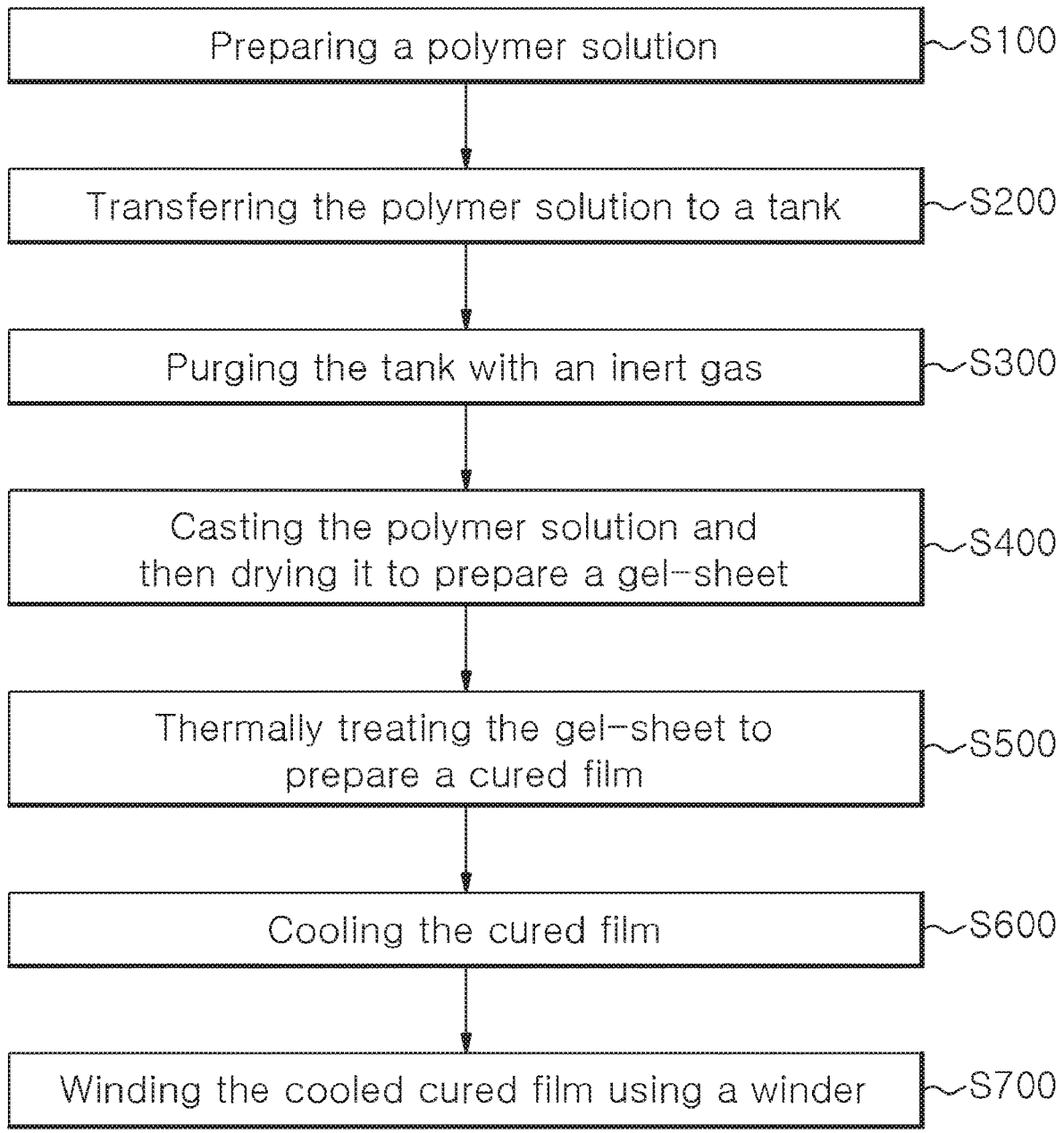
FIG. 2 is a schematic flow diagram of a process for preparing a base film according to an embodiment.

Referring to FIG. 2, the process for preparing a base film comprises simultaneously or sequentially mixing a diamine compound and a dicarbonyl compound, or a diamine compound, a dianhydride compound, and a dicarbonyl compound, in an organic solvent in a polymerization apparatus, and reacting the mixture to prepare a polymer solution (S100); charging the polymer solution to a tank (S200); purging with an inert gas (S300); casting the polymer solution in the tank onto a belt and then drying it to prepare a gel-sheet (S400); thermally treating the gel-sheet while it is moved to prepare a cured film (S500); cooling the cured film while it is moved (S600); and winding the cooled cured film using a winder (S700).

The base film is a film that comprises a polyamide-based resin as a main component. The polyamide-based resin is a resin that comprises an amide repeat unit as a structural unit. In addition, the polyamide-based film may comprise an imide repeat unit as well.

In the process for preparing a base film, a polymer solution for preparing the polyamide-based resin is prepared by simultaneously or sequentially mixing a diamine compound and a dicarbonyl compound, or a diamine compound, a dianhydride compound, and a dicarbonyl compound, in an organic solvent in a polymerization apparatus, and reacting the mixture (S100).

In an embodiment, the polymer solution may be prepared by simultaneously mixing and reacting a diamine compound and a dicarbonyl compound, or a diamine compound, a dianhydride compound, and a dicarbonyl compound, in an organic solvent.

In another embodiment, the step of preparing the polymer solution may comprise mixing and reacting the diamine compound and the dicarbonyl compound in a solvent to produce a polyamide (PA) solution. The polyamide solution is a solution that comprises a polymer having an amide repeat unit.

In still another embodiment, the step of preparing the polymer solution may comprise first mixing and reacting the diamine compound and the dianhydride compound in a solvent to produce a polyamic acid (PAA) solution; and second mixing and reacting the polyamic acid (PAA) solution and the dicarbonyl compound to form an amide bond and an imide bond. The polyamic acid solution is a solution that comprises a polyamic acid.

Alternatively, the step of preparing the polymer solution may comprise first mixing and reacting the diamine compound and the dianhydride compound in a solvent to produce a polyamic acid solution; subjecting the polyamic acid solution to dehydration to produce a polyimide (PI) solution; and second mixing and reacting the polyimide (PI) solution and the dicarbonyl compound to further form an amide bond. The polyimide solution is a solution that comprises a polymer having an imide repeat unit.

In still another embodiment, the step of preparing the polymer solution may comprise first mixing and reacting the diamine compound and the dicarbonyl compound in a solvent to produce a polyamide (PA) solution; and second mixing and reacting the polyamide (PA) solution and the dianhydride compound to further form an imide bond. The polyamide solution is a solution that comprises a polymer having an amide repeat unit.

The polymer solution thus prepared may be a solution that comprises a polymer containing at least one selected from the group consisting of a polyamic acid (PAA) repeat unit, a polyamide (PA) repeat unit, and a polyimide (PI) repeat unit.

The polymer contained in the polymer solution comprises an amide repeat unit derived from the polymerization of the diamine compound and the dicarbonyl compound.

Alternatively, the polymer contained in the polymer solution comprises an imide repeat unit derived from the polymerization of the diamine compound and the dianhydride compound and an amide repeat unit derived from the polymerization of the diamine compound and the dicarbonyl compound.

The content of solids contained in the polymer solution may be 10% by weight to 30% by weight. Alternatively, the content of solids contained in the second polymer solution may be 15% by weight to 25% by weight, but it is not limited thereto.

If the content of solids contained in the polymer solution is within the above range, a base film can be effectively produced in the extrusion and casting steps. In addition, the base film thus produced may have mechanical properties in terms of an improved modulus and the like and optical properties in terms of a low yellow index and the like.

In an embodiment, the step of preparing the polymer solution may further comprise introducing a catalyst.

Here, the catalyst may comprise at least one selected from the group consisting of beta picoline, acetic anhydride, isoquinoline (IQ), and pyridine-based compounds, but it is not limited thereto.

The catalyst may be added in an amount of 0.01 to 0.4 molar equivalent based on 1 mole of the polyamic acid, but it is not limited thereto.

The further addition of the catalyst may expedite the reaction rate and enhance the chemical bonding force between the repeat unit structures or that within the repeat unit structures.

In another embodiment, the step of preparing the polymer solution may further comprise adjusting the viscosity of the polymer solution.

Specifically, the step of preparing the polymer solution may comprise (a) simultaneously or sequentially mixing and reacting a diamine compound and a dicarbonyl compound, or a diamine compound, a dianhydride compound, and a dicarbonyl compound, in an organic solvent to prepare a first polymer solution; (b) measuring the viscosity of the first polymer solution and evaluating whether the target viscosity has been reached; and (c) if the viscosity of the first polymer solution does not reach the target viscosity, further adding the dicarbonyl compound to prepare a second polymer solution having the target viscosity.

The target viscosity may be 100,000 cps to 500,000 cps at room temperature. Specifically, the target viscosity may be 100,000 cps to 400,000 cps, 100,000 cps to 350,000 cps, 100,000 cps to 300,000 cps, 150,000 cps to 300,000 cps, or 150,000 cps to 250,000 cps, but it is not limited thereto.

In the steps of preparing the first polymer solution and the second polymer solution, the polymer solutions have viscosities different from each other. For example, the second polymer solution has a viscosity higher than that of the first polymer solution.

In the steps of preparing the first polymer solution and the second polymer solution, the stirring speeds are different from each other. For example, the stirring speed when the first polymer solution is prepared is faster than the stirring speed when the second polymer solution is prepared.

In still another embodiment, the step of preparing the polymer solution may further comprise adjusting the pH of the polymer solution. In this step, the pH of the polymer solution may be adjusted to 4 to 7, for example 4.5 to 7.

The pH of the polymer solution may be adjusted by adding a pH adjusting agent. The pH adjusting agent is not particularly limited and may include, for example, amine-based compounds such as alkoxyamine, alkylamine, and alkanolamine.

If the pH of the polymer solution is adjusted to the above range, it is possible to prevent the damage to the equipment in the subsequent process, to prevent the occurrence of defects in the film produced from the polymer solution, and to achieve the desired optical properties and mechanical properties in terms of yellow index and modulus.

The pH adjusting agent may be employed in an amount of 0.1% by mole to 10% by mole based on the total number of moles of monomers in the polymer solution.

In another embodiment, the step of preparing the polymer solution may further comprise purging the tank with an inert gas. The step of purging the tank with an inert gas may remove moisture, reduce impurities, increase the reaction yield, and impart excellent surface appearance and mechanical properties to the film finally produced.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The molar ratio of the dianhydride compound to the dicarbonyl compound used to prepare the polymer solution may be 0:100 to 25:75, for example, 0:100 to 20:80 or 0:100 to 15:85. If the dianhydride compound and the dicarbonyl compound are employed in the above molar ratio, it is advantageous for achieving the desired mechanical and optical properties of the base film prepared from the polymer solution.

The details on the diamine compound, the dianhydride compound, and the dicarbonyl compound are as described above.

In an embodiment, the organic solvent may be at least one selected from the group consisting of dimethylformamide (DMF), dimethylacetamide (DMAc), N-methyl-2-pyrrolidone (NMP), m-cresol, tetrahydrofuran (THF), and chloroform. The organic solvent employed in the polymer solution may be dimethylacetamide (DMAc), but it is not limited thereto.

Next, after the step of preparing the polymer solution, the polymer solution is transferred to a tank (S200).

Figure 3:
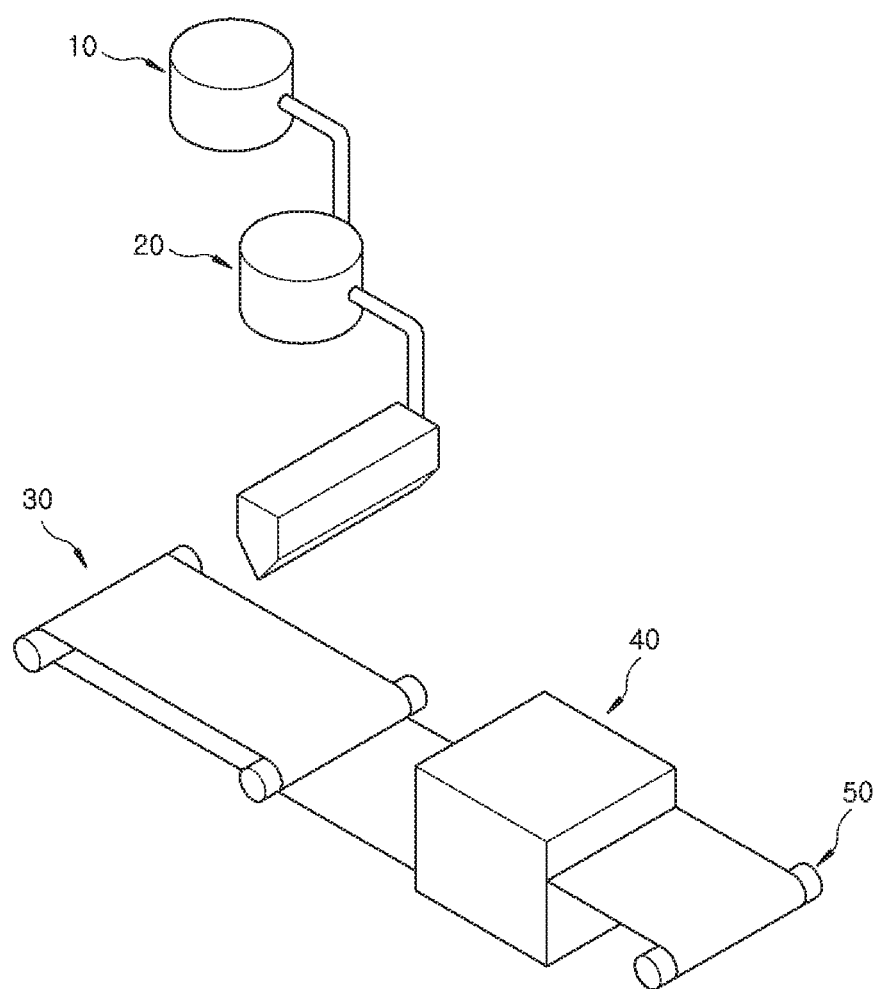
FIG. 3 schematically illustrates process facilities for preparing a base film according to an embodiment.

FIG. 3 schematically illustrates process facilities for preparing a base film according to an embodiment. Referring to FIG. 3, the polymer solution as described above is prepared in a polymerization apparatus (10), and the polymer solution thus produced is transferred to, and stored, in a tank (20).

Here, once the polymer solution has been obtained, the step of transferring the polymer solution to the tank is carried out without any additional steps. Specifically, the polymer solution prepared in the polymerization apparatus is transferred to, and stored in, the tank without any separate precipitation and redissolution steps for removing impurities. In the conventional process, in order to remove impurities such as hydrochloric acid (HCl) generated during the preparation of a polymer solution, the polymer solution thus prepared is purified through a separate step to remove the impurities, and the purified polymer solution is then redissolved in a solvent. In this case, however, there has been a problem that the loss of the active ingredient increases in the step of removing the impurities, resulting in decreases in the yield.

Accordingly, the preparation process according to an embodiment ultimately minimizes the amount of impurities generated in the step of preparing the polymer solution or properly controls the impurities in the subsequent steps, even if a certain amount of impurities is present, so as not to deteriorate the physical properties of the final film. Thus, the process has an advantage in that a film is produced without separate precipitation or redissolution steps.

The tank (20) is a place for storing the polymer solution before forming it into a film, and its internal temperature may be −20° C. to 20° C.

Specifically, the internal temperature may be −20° C. to 10° C., −20° C. to 5C, −20° C. to 0° C., or 0° C. to 10° C., but it is not limited thereto.

If the internal temperature of the tank (20) is controlled to the above range, it is possible to prevent the polymer solution from deteriorating during storage, and it is possible to lower the moisture content to thereby prevent defects of the film produced therefrom.

The process for preparing a base film may further comprise carrying out vacuum degassing of the polymer solution transferred to the tank (20).

The vacuum degassing may be carried out for 30 minutes to 3 hours after depressurizing the internal pressure of the tank to 0.1 bar to 0.7 bar. The vacuum degassing under these conditions may reduce bubbles in the polymer solution. As a result, it is possible to prevent surface defects of the film produced therefrom and to achieve excellent optical properties such as haze.

In addition, the process for preparing a base film may further comprise purging the polymer solution transferred to the tank (20) with an inert gas (S300).

Specifically, the purging is carried out by purging the tank with an inert gas at an internal pressure of 1 atm to 2 atm. The nitrogen purging under these conditions may remove moisture in the polymer solution, reduce impurities to thereby increase the reaction yield, and achieve excellent optical properties such as haze and mechanical properties.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The step of vacuum degassing and the step of purging the tank with an inert gas are performed in a separate process, respectively.

For example, the step of vacuum degassing may be carried out, followed by the step of purging the tank with an inert gas, but it is not limited thereto.

The step of vacuum degassing and/or the step of purging the tank with an inert gas may improve the physical properties of the surface of the base film thus produced.

Thereafter, the process may further comprise storing the polymer solution in the tank (20) for 1 hour to 360 hours. Here, the temperature inside the tank may be kept at −20° C. to 20° C.

The process for preparing a base film may further comprise casting the polymer solution in the tank and then drying it to prepare a gel-sheet (S400).

The polymer solution may be cast onto a casting body such as a casting roll or a casting belt.

Referring to FIG. 3, according to an embodiment, the polymer solution may be applied onto a casting belt (30) as a casting body, and it is dried while it is moved to be made into a sheet in the form of a gel.

When the polymer solution is injected onto the belt (30), the injection rate may be 300 g/min to 700 g/min. If the injection rate of the polymer solution satisfies the above range, the gel-sheet can be uniformly formed to an appropriate thickness.

In addition, the casting thickness of the polymer solution may be 200 μm to 700 μm. If the polymer solution is cast to a thickness within the above range, the final film produced after the drying and thermal treatment may have an appropriate and uniform thickness.

As described above, the viscosity of the polymer solution at room temperature may be 100,000 cps to 500,000 cps, for example, 100,000 cps to 400,000 cps, 100,000 cps to 350,000 cps, 150,000 cps to 350,000 cps, or 150,000 cps to 250,000 cps. If the viscosity satisfies the above range, the polymer solution can be cast onto a belt in a uniform thickness without defects.

The polymer solution is cast and then dried at a temperature of 60° C. to 150° C. for 5 minutes to 60 minutes to prepare a gel-sheet. The solvent of the polymer solution is partially or totally volatilized during the drying to prepare the gel-sheet.

The moving speed of the gel-sheet on the casting body at the time of drying may be 0.1 m/min to 15 m/min, for example, 0.5 m/min to 10 m/min, but it is not limited thereto.

The process for preparing a base film comprises thermally treating the gel-sheet while it is moved to prepare a cured film (S500).

The thermal treatment of the gel-sheet is carried out in the temperature range of 60° C. to 500° C. for 5 to 190 minutes. Specifically, the thermal treatment of the gel-sheet may be carried out in the temperature range of 60° C. to 480° C. at a temperature elevation rate of 2° C./min to 90° C./min for 10 minutes to 160 minutes.

In the thermal treatment step, the gel-sheet may be stretched in the transverse direction (TD). That is, the gel-sheet may be stretched by about 1.01 times to about 1.05 times in the transverse direction simultaneously with the thermal treatment step. The gel-sheet may be stretched simultaneously with the first hot air treatment step described below. Thus, the base film may be stretched by about 1.01 times to about 1.05 times in the transverse direction, but it is not limited thereto.

Referring to FIG. 3, the thermal treatment of the gel-sheet may be carried out by passing it through a thermosetting device (40).

When the gel-sheet passes through the thermosetting device (40), it is treated with hot air. If the thermal treatment is carried out with hot air, the heat may be uniformly supplied. If the heat is not uniformly supplied, satisfactory mechanical properties cannot be achieved. In particular, a satisfactory surface roughness cannot be achieved, which may raise or lower the surface tension too much.

According to an embodiment, the thermal treatment of the gel-sheet may be carried out in two or more steps.

According to another embodiment, the thermal treatment may be carried out until the content of the residual solvent contained in the gel-sheet is 1,000 ppm or less.

According to still another embodiment, the thermal treatment may be carried out until the IS value is 10 to 100.

Specifically, the thermal treatment comprises a first hot air treatment step carried out for 5 to 30 minutes in the range of 60° C. to 120° C.; and a second hot air treatment step carried out for 10 minutes to 120 minutes in the range of 180° C. to 380° C.

In the thermal treatment, the second thermal treatment step is carried out after the first thermal treatment step. In such event, if the content of the organic solvent contained in the gel-sheet exceeds 1,000 ppm upon the second thermal treatment step, a third thermal treatment step may be additionally carried out. Alternatively, if the IS value does not satisfy the range of 10 to 100 upon the second thermal treatment step, a third thermal treatment step may be additionally carried out.

For example, the third thermal treatment may be carried out in the range of 200° C. to 350° C. until the content of the residual solvent contained in the gel-sheet is 1,000 ppm or less, or until the IS value is 10 to 100.

The thermal treatment under these conditions may cure the gel-sheet to have an appropriate surface hardness and modulus, and the cured film may have excellent folding characteristics, optical properties, and mechanical properties at high temperatures and high humidity.

The process for preparing a base film comprises cooling the cured film while it is moved (S600).

Referring to FIG. 3, the cooling of the cured film is carried out after it has been passed through the thermosetting device (40). It may be carried out by using a separate cooling chamber (not shown) or by forming an appropriate temperature atmosphere without a separate cooling chamber.

The step of cooling the cured film while it is moved may comprise a first temperature lowering step of reducing the temperature at a rate of 100° C./min to 1,000° C./min and a second temperature lowering step of reducing the temperature at a rate of 40° C./min to 400° C./min.

In such event, specifically, the second temperature lowering step is performed after the first temperature lowering step. The temperature lowering rate of the first temperature lowering step may be faster than the temperature lowering rate of the second temperature lowering step.

For example, the maximum rate of the first temperature lowering step is faster than the maximum rate of the second temperature lowering step. Alternatively, the minimum rate of the first temperature lowering step is faster than the minimum rate of the second temperature lowering step.

If the step of cooling the cured film is carried in such a multistage manner, it is possible to have the physical properties of the cured film further stabilized and to maintain the optical properties and mechanical properties of the film achieved during the curing step more stably for a long period of time.

The moving speed of the gel-sheet and the moving speed of the cured film are the same.

The process for preparing a base film comprises winding the cooled cured film using a winder (S700).

Referring to FIG. 3, the cooled cured film may be wound using a roll-shaped winder (50).

In such event, the ratio of the moving speed of the gel-sheet on the belt at the time of drying to the moving speed of the cured film at the time of winding is 1:0.95 to 1:1.40. Specifically, the ratio of the moving speeds may be 1:0.99 to 1:1.20, 1:0.99 to 1:1.10, or 1:1.0 to 1:1.05, but it is not limited thereto.

If the ratio of the moving speeds is outside the above range, the mechanical properties of the cured film may be impaired, and the flexibility and elastic properties may be deteriorated.

In the process for preparing a base film, the thickness variation (%) according to the following Relationship 1 may be 3% to 30%. Specifically, the thickness variation (%) may be 5% to 20%, but it is not limited thereto.

Thickness variation (%)=(M1−M2)/M2×100    [Relationship 1]

In the above Relationship 1, M1 is the thickness (μm) of the gel-sheet, and M2 is the thickness (μm) of the cooled cured film at the time of winding.

The polyimide-based film prepared by the preparation process as described above is excellent in optical properties and mechanical properties. The polyimide-based film may be applicable to various uses that require flexibility and transparency. For example, the polyimide-based film may be applied to solar cells, displays, semiconductor devices, sensors, and the like. In addition, since the base film has excellent durability in a high-humidity environment, it can advantageously protect a display unit in a high-humidity environment.

The details on the base film prepared by the process for preparing a polyamide-imide film are as described above.

Hereinafter, the above description will be described in detail by referring to examples. However, these examples are set forth to illustrate the present invention, and the scope of the present invention is not limited thereto.

EXAMPLE

Example 1

A 1-liter glass reactor equipped with a temperature-controllable double jacket was charged with 779.1 g of dimethylacetamide (DMAc) as an organic solvent at 20° C. under a nitrogen atmosphere. Then, 64 g (0.2 mole) of 2,2'-bis(trifluoromethyl)-4,4'-diaminobiphenyl (TFMB) was slowly added thereto for dissolution thereof. Subsequently, 4.44 g (0.01 mole) of 2,2'-bis(3,4-dicarboxyphenyl) hexafluoropropane dianhydride (6FDA) was slowly added thereto, and the mixture was stirred for 1 hour. Then, 12.18 g (0.06 mole) of isophthaloyl chloride (IPC) was added, followed by stirring for 1 hour. And 26.39 g (0.13 mole) of terephthaloyl chloride (TPC) was added, followed by stirring for 1 hour, thereby preparing a polymer solution. The polymer solution thus obtained was coated onto a glass plate and then dried with hot air at 100° C. for 20 minutes. It was then detached from the glass plate and then fixed to a pin frame, which was thermally treated at about 200° C. for 20 minutes to obtain a base film having a thickness of 50 μm. When the dried gel-sheet was fixed to the pin frame, it was stretched by about 1.04 times.

As to the contents of TFMB, 6FDA, IPC, and TPC, the number of moles of the dianhydride compound and the dicarbonyl compounds based on 100 moles of the diamine compound is shown in Table 1 below.

Examples 2 to 4 and Comparative Examples 1 to 3

Films were prepared in the same manner as in Example 1, except that the types and contents of the respective reactants, the temperature and time of the thermal treatment, and the like were changed as shown in Table 1 below.

Evaluation Example

The films prepared in Examples 1 to 4 and Comparative Examples 1 to 3 were each measured and evaluated for the following properties. The results are shown in Table 1 below.

Evaluation Example 1: Measurement of Film Thickness

The thickness was measured at 5 points in the transverse direction using a digital micrometer 547-401 manufactured by Mitutoyo Corporation. Their average value was adopted as the thickness.

Evaluation Example 2: Measurement of Transmittance and Haze

The light transmittance and the haze at 550 nm were measured using a haze meter NDH-5000W manufactured by Nippon Denshoku Kogyo.

Evaluation Example 3: Measurement of Yellow Index

The yellow Index (YI) was measured with a spectrophotometer (UltraScan PRO, Hunter Associates Laboratory) using a CIE colorimetric system.

Evaluation Example 4: Measurement of Modulus

A sample was cut out by at least 5 cm in the direction perpendicular to the main shrinkage direction of the film and by 10 cm in the main shrinkage direction. It was fixed by the clips disposed at intervals of 5 cm in a universal testing machine UTM 5566A of Instron. A stress-strain curve was obtained until the sample was fractured while it was stretched at a rate of 5 mm/min at room temperature. The slope of the load with respect to the initial strain on the stress-strain curve was taken as the modulus (GPa).

Evaluation Example 5: Measurement of Moisture Permeability

A PREMATRAN-W moisture meter was used to measure the moisture transmission rate according to ASTM F 372.

Evaluation Example 6: Measurement of Residual Solvents in a Film 0.02 g of a sample was taken and purged for 1 hour at 30° C. using a Purge&Trap-GC/MSD device. The outgassing was collected at 300° C. for 10 minutes, which was quantitatively and qualitatively analyzed to measure the amount of residual solvents.

TABLE 1

|  | Ex. 1 | Ex. 2 | Ex. 3 | Ex. 4 | C. Ex. 1 | C. Ex. 2 | C. Ex. 3 |
|---|---|---|---|---|---|---|---|
| Diamine | TFMB 100 | TFMB 100 | TFMB 100 | TFMB 100 | TFMB 100 | TFMB 100 | ODA 100 |
| Dianhydride | 6FDA 5 | — | 6FDA 25 | 6FDA 25 | 6FDA 30 | 6FDA 25 | PMDA 100 |
| Dicarbonyl compound | IPC 30 TPC 65 | IPC 30 TPC 70 | IPC 15 TPC 60 | IPC 15 TPC 60 | TPC 70 | IPC 15 TPC 60 | — |
| Imide:amide | 5:95 | 0:100 | 25:75 | 25:75 | 30:70 | 25:75 | 100:0 |
| Thickness (μm) | 50 | 50 | 50 | 50 | 50 | 50 | 50 |
| TT (%) | 89.0 | 89.1 | 89.0 | 89.0 | 88.5 | 88.8 | 73.2 |
| HZ (%) | 0.4 | 0.4 | 0.4 | 0.4 | 0.5 | 0.6 | 1.2 |
| YI | 2.4 | 2.9 | 2.4 | 2.6 | 2.9 | 2.7 | 90.7 |
| Modulus | 7.0 | 7.1 | 6.7 | 6.8 | 6.4 | 6.4 | 5.5 |
| Moisture permeability (g/m² · day) | 150.5 | 160.7 | 251.9 | 228.8 | 367.1 | 321.5 | 32.2 |

TABLE 1-continued

|  | Ex. 1 | Ex. 2 | Ex. 3 | Ex. 4 | C. Ex. 1 | C. Ex. 2 | C. Ex. 3 |
| --- | --- | --- | --- | --- | --- | --- | --- |
| Thermal treatment temp. (min.) | 100° C. (20 min.) 200° C. (20 min.) | 110° C. (20 min.) 200° C. (20 min.) | 100° C. (20 min.) 200° C. (20 min.) | 120° C. (20 min.) 220° C. (20 min.) | 80° C. (20 min.) 180° C. (20 min.) | 50° C. (20 min.) 180° C. (20 min.) | 100° C. (20 min.) 200° C. (20 min.) |
| Residual solvent (ppm) | 322 | 289 | 312 | 204 | 740 | 1131 | 515 |
| IS value | 37.2 | 28.9 | 56.2 | 45.4 | 104 | 138.1 | 151.5 |

As can be seen from Table 1, the base films of Examples 1 to 4 had a moisture permeability of 300 g/m² ·day or less. Further, the base films of Examples 1 to 4 were excellent in such optical properties as transmittance, haze, and yellow index, and had a high modulus in general.

In contrast, the base films of Comparative Examples 1 and 2 had a moisture permeability exceeding 300 g/m² ·day. Since these base films having a high moisture permeability are vulnerable to moisture permeation, they are not suitable for use as abase film for protecting a display.

In addition, although the base film of Comparative Example 3, which is a polyimide film, had a very low moisture permeability, it had poor optical properties in terms of a yellow index of 90.7. Thus, it is not suitable as a base film for a cover window.

REFERENCE NUMERALS OF THE DRAWINGS

- 10: polymerization apparatus
- 20: tank
- 30: belt
- 40: thermosetting device
- 50: winder
- 100: base film
- 101: first side
- 102: second side
- 200: functional layer
- 300: cover window
- 400: display unit
- 500: adhesive layer

The invention claimed is:

1. A cover window for a display device, which comprises a base film comprising a polyamide-based polymer and having a moisture permeability of 30 g/m²·day to 300 g/m²·day measured in the thickness direction according to ASTM F 372; and a functional layer,
   wherein the polyamide-based polymer is formed by polymerizing a diamine compound, a dicarbonyl compound, and optionally a dianhydride compound, and the molar ratio of the dianhydride compound and the dicarbonyl compound is 0:100 to 25:75,
   wherein a thickness of the base film is 20 μm to 150 μm,
   wherein a content of a residual solvent in the base film is 1,000 ppm or less,
   wherein the base film has a modulus of 6.5 GPa or more,
   wherein the base film has a yellow index of 3 or less, a transmittance at 550nm of 88% or more, a haze at 550 nm of 1% or less, and
   wherein the IS value represented by the following Equation 1 is 10 to 100:

$$IS = IM + \frac{RS}{10} \qquad \text{[Equation 1]}$$

wherein, in Equation 1, IM stands for the number of moles of the imide repeat unit when the total number of moles of the imide repeat unit and the amide repeat unit in the film is 100; and RS stands for the content (ppm) of the residual solvent in the film.

2. The cover window for a display device of claim 1, wherein the base film is stretched by 1.01 times to 1.05 times in the transverse direction.

3. The cover window for a display device of claim 1, wherein the polymer contained in the base film comprises a repeat unit represented by the following Formula A and a repeat unit represented by the following Formula B at a molar ratio of 0:100 to 25:75:

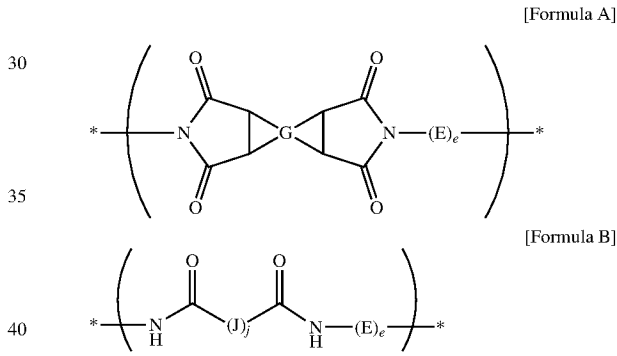

E and J are each independently selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—, e and j are each independently selected from integers of 1 to 5, when e is 2 or more, then the 2 or more Es are the same as, or different from, each other, when j is 2 or more, then the 2 or more Js are the same as, or different from, each other, and G is bonded by a bonding group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone or may be bonded to each other to form a condensed ring, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

4. The cover window for a display device of claim 1, wherein the base film further comprises a filler.

5. The cover window for a display device of claim 4, wherein the content of the filler is 0.01 to 3% by weight based on the total weight of the base film.

6. A base film for a display device, which comprises a polyamide-based polymer and has a moisture permeability of 30 g/m$^2$·day to 300 g/m$^2$·day measured in the thickness direction according to ASTM F 372,
wherein the polyamide-based polymer is formed by polymerizing a diamine compound, a dicarbonyl compound, and optionally a dianhydride compound, and the molar ratio of the dianhydride compound and the dicarbonyl compound is 0:100 to 25:75,
wherein a thickness of the base film is 20 μm to 150 μμm,
wherein a content of a residual solvent in the base film is 1,000 ppm or less,
wherein the base film has a modulus of 6.5 GPa or more,
wherein the base film has a yellow index of 3 or less, a transmittance at 550 nm of 88% or more, a haze at 550 nm of 1% or less, and
wherein the IS value represented by the following Equation 1 is 10 to 100:

$$IS = IM + \frac{RS}{10} \quad \text{[Equation 1]}$$

wherein, in Equation 1, IM stands for the number of moles of the imide repeat unit when the total number of moles of the imide repeat unit and the amide repeat unit in the film is 100; and RS stands for the content (ppm) of the residual solvent in the film.

7. A display device, which comprises a display panel; and a cover window disposed on the display panel,
wherein the cover window comprises a base film and a functional layer,
wherein the base film comprises a polyamide-based polymer and has a moisture permeability of 30 g/m$^2$·day to 300 g/m$^2$·day measured in the thickness direction according to ASTM F 372,
wherein the polyamide-based polymer is formed by polymerizing a diamine compound, a dicarbonyl compound, and optionally a dianhydride compound, and the molar ratio of the dianhydride compound and the dicarbonyl compound is 0:100 to 25:75,
wherein a thickness of the base film is 20 μm to 150 μm,
wherein a content of a residual solvent in the base film is 1,000 ppm or less,
wherein the base film has a modulus of 6.5 GPa or more,
wherein the base film has a yellow index of 3 or less, a transmittance at 550 nm of 88% or more, a haze at 550 nm of 1% or less, and
wherein the IS value represented by the following Equation 1 is 10 to 100:

$$IS = IM + \frac{RS}{10} \quad \text{[Equation 1]}$$

wherein, in Equation 1, IM stands for the number of moles of the imide repeat unit when the total number of moles of the imide repeat unit and the amide repeat unit in the film is 100; and RS stands for the content (ppm) of the residual solvent in the film.

8. A process for producing the base film for a display device according to claim 6, which comprises:
preparing a polyamide-based polymer solution in an organic solvent;
charging the polymer solution into a tank;
extruding and casting the polymer solution in the tank and then drying it to prepare a gel sheet; and
thermally treating the gel sheet,
wherein the thermal treatment step of the gel sheet is carried out in two or more treatment steps with hot air,
wherein the thermal treatment comprises a first hot air treatment step carried out for 5 to 30 minutes in the range of 60° C. to 120° C.; and a second hot air treatment step carried out for 10 minutes to 120 minutes in the range of 180° C. to 380°° C.

\* \* \* \* \*